US012304418B2

(12) United States Patent
Yamazaki

(10) Patent No.: US 12,304,418 B2
(45) Date of Patent: May 20, 2025

(54) AIRBAG DEVICE AND METHOD FOR INFLATING AIRBAG DEVICE

(71) Applicant: DAICEL CORPORATION, Osaka (JP)

(72) Inventor: Masayuki Yamazaki, Tokyo (JP)

(73) Assignee: Daicel Corporation, Osaka (JP)

( * ) Notice: Subject to any disclaimer, the term of this patent is extended or adjusted under 35 U.S.C. 154(b) by 0 days.

(21) Appl. No.: 18/621,608

(22) Filed: Mar. 29, 2024

(65) Prior Publication Data

US 2024/0239298 A1 Jul. 18, 2024

Related U.S. Application Data

(63) Continuation of application No. PCT/JP2022/015816, filed on Mar. 30, 2022.

(30) Foreign Application Priority Data

Sep. 30, 2021 (JP) .................................. 2021-161681

(51) Int. Cl.
*B60R 21/264* (2006.01)
*B60R 21/203* (2006.01)
(Continued)

(52) U.S. Cl.
CPC ........ *B60R 21/2646* (2013.01); *B60R 21/217* (2013.01); *B60R 21/263* (2013.01);
(Continued)

(58) Field of Classification Search
CPC . B60R 21/2646; B60R 21/217; B60R 21/263; B60R 21/2644; B60R 21/203;
(Continued)

(56) References Cited

U.S. PATENT DOCUMENTS 3,552,770 A 1/1971 Berryman
3,776,570 A * 12/1973 Weman .................. B60R 21/23
244/31

(Continued)

OTHER PUBLICATIONS

International Search Report dated Jun. 14, 2022, issued in counterpart Application No. PCT/JP2022/015816. (5 pages).
(Continued)

*Primary Examiner* — Timothy Wilhelm
(74) *Attorney, Agent, or Firm* — WHDA, LLP

(57) ABSTRACT

An airbag device includes a gas generator including a first gas generating agent and an ignition unit, and an airbag configured to inflate upon receiving a combustion gas from the gas generator, the airbag including an inlet being configured to cause the combustion gas supplied from the gas generator to flow into an internal space of the airbag, a bag-shaped portion configured to separate, from an outside, the internal space into which the combustion gas flows from the inlet, the bag-shaped portion being configured to be in a folded state and to be in an inflated state by receiving the supply of the combustion gas, and a second gas generating agent that is disposed at a predetermined position on an inner surface of the bag-shaped portion and generates gas by using thermal energy of the combustion gas without accompanying a combustion reaction.

22 Claims, 15 Drawing Sheets

(51) Int. Cl.
*B60R 21/217* (2011.01)
*B60R 21/235* (2006.01)
*B60R 21/26* (2011.01)
*B60R 21/263* (2011.01)

(52) U.S. Cl.
CPC ........ *B60R 21/2644* (2013.01); *B60R 21/203* (2013.01); *B60R 21/2035* (2013.01); *B60R 2021/23504* (2013.01); *B60R 2021/23509* (2013.01); *B60R 2021/26029* (2013.01); *B60R 2021/2648* (2013.01)

(58) Field of Classification Search
CPC ...... B60R 21/2035; B60R 2021/23504; B60R 2021/23509; B60R 2021/26029; B60R 2021/2648
See application file for complete search history.

(56) References Cited

U.S. PATENT DOCUMENTS

| | | | | |
|---|---|---|---|---|
| 5,066,039 A | * | 11/1991 | Shitanoki | B60R 21/01 149/3 |
| 5,584,507 A | * | 12/1996 | Khandhadia | C06D 5/06 422/171 |
| 5,904,369 A | * | 5/1999 | Swann | C06D 5/06 280/743.1 |
| 6,062,143 A | * | 5/2000 | Grace | C06B 45/12 280/736 |
| 6,123,360 A | * | 9/2000 | Amin | B60R 21/2646 280/730.2 |
| 6,685,223 B2 | * | 2/2004 | Furusawa | C06B 23/04 55/482.1 |
| 6,886,469 B2 | * | 5/2005 | Shilliday | B60R 21/2644 102/530 |
| 9,205,801 B2 | * | 12/2015 | Osterfeld | B60R 21/262 |
| 9,415,742 B1 | * | 8/2016 | Sasakura | B60R 21/232 |
| 11,407,378 B2 | * | 8/2022 | Fenyves | B60R 21/2646 |
| 11,975,676 B2 | * | 5/2024 | Schmid | B32B 7/09 |
| 2006/0214400 A1 | * | 9/2006 | Enders | B60R 21/231 280/730.1 |
| 2022/0332273 A1 | * | 10/2022 | Fischer | B60R 21/261 |

OTHER PUBLICATIONS

Written Opinion dated Jun. 14, 2022, issued in counterpart Application No. PCT/JP2022/015816, with English Translation. (6 pages).

* cited by examiner

AIRBAG DEVICE AND METHOD FOR INFLATING AIRBAG DEVICE

TECHNICAL FIELD

The present invention relates to an airbag device and a method for inflating an airbag device.

BACKGROUND ART

These days, vehicles are equipped with airbag devices that inflate airbags at the time of collision to protect occupants. Various types of airbag devices have been proposed for use in vehicles, and the airbag devices are provided at a steering wheel, a side portion of a seat, near a window side of a roof, and the like.

Patent Document 1 discloses an airbag device that protects occupants by expanding a confinement by rapidly generating gas when an accident occurs.

CITATION LIST

Patent Document

Patent Document 1: U.S. Pat. No. 3,552,770

SUMMARY

The airbag device supplies the gas into the airbag at a high pressure and thus quickly inflates the airbag at the time of collision of the vehicle. In particular, in a case of side collision of the vehicle, since a distance between the occupant and an inner surface of the vehicle is short, a side airbag device that buffers an impact when the occupant collides with the inner surface of the vehicle is desirably inflated more rapidly than any other types of airbag devices, and a pressure of the gas to be supplied tends to be made high. Also, a force to break an airbag module requires an initial pressure in the airbag to be made high. Note that the airbag device is designed in such a manner that even when the gas pressure supplied to the airbag is high, the airbag does not affect the occupant when the airbag inflates as long as the occupant is wearing a seat belt and is riding at a normal position. However, when the airbag device is actuated in an inappropriate state, for example, when the occupant is not riding at the normal position and is leaning against the airbag device or when an object is being placed on a portion of the airbag device to inflate, the pressure at the time of inflation may be transmitted to the leaning occupant or the object placed on the inflating portion may be flicked off and hit the occupant. In such a case, when the pressure of the gas supplied to the airbag is high, there is a possibility that an influence on the occupant is significant.

The technique according to the present disclosure has been made in view of the above circumstances, and an object of the present disclosure is to provide a technique that improves reliability of an airbag device.

Solution to Problem

To solve the above-described problems, according to an aspect of the present disclosure, there is provided an airbag device including a gas generator including a first gas generating agent that generates a combustion gas by ignition and an ignition unit configured to ignite the first gas generating agent, and an airbag configured to inflate upon receiving supply of the combustion gas from the gas generator, wherein the airbag includes an inflow portion connected to the gas generator, the inflow portion being configured to cause the combustion gas supplied from the gas generator to flow into an internal space of the airbag, a bag-shaped portion that is a bag-shaped member configured to separate, from an outside, the internal space into which the combustion gas flows from the inflow portion, the bag-shaped portion being configured to be in a folded state before receiving the supply of the combustion gas and to be in an inflated state by receiving the supply of the combustion gas, and a second gas generating agent that is disposed at a predetermined position on an inner surface of the bag-shaped portion and generates gas by using thermal energy of the combustion gas without accompanying a combustion reaction.

In the airbag device, a discharge port of the combustion gas in the gas generator may be disposed toward the internal space, and the second gas generating agent may be disposed facing the discharge port in the bag-shaped portion in the folded state.

In the airbag device, a discharge port of the combustion gas in the gas generator may be disposed toward the internal space, and the second gas generating agent may be disposed on the inner surface of the bag-shaped portion at a position away from the discharge port in an inflating direction when the bag-shaped portion inflates from the folded state due to inflow of the combustion gas.

In the airbag device, the gas generator may include a housing in which a gas discharge port configured to discharge the combustion gas is formed, a deflector may be disposed around the gas discharge port, the deflector being configured to deflect a flow direction of the combustion gas in the inflating direction of the bag-shaped portion, and the second gas generating agent may be disposed in a portion to which the combustion gas deflected by the deflector is guided.

The second gas generating agent may be a substance that is decomposed, vaporized, or sublimated by the thermal energy of the combustion gas and thus generates the gas.

The combustion gas may be supplied at a timing earlier by a predetermined period of time than a timing at which the gas is to be generated from the second gas generating agent.

In the airbag device, when a period during which the combustion gas is supplied to the bag-shaped portion is defined as a first period, the second gas generating agent may generate the gas over a second period longer than the first period.

In the airbag device, a cover that is exhausted by the thermal energy of the combustion gas may be disposed, and thus, may cover at least a part of the second gas generating agent.

In the airbag device, a plurality of the second gas generating agents having reaction temperatures different from each other in generating the gas may be provided at a plurality of positions, and among the plurality of second gas generating agents provided at the plurality of positions, the second gas generating agent having the reaction temperature higher than a reaction temperature of another second gas generating agent may be disposed on an upstream side from the other second gas generating agent in a flow direction of the combustion gas supplied from the gas generator.

To solve the above-described problems, according to an aspect of the present disclosure, there is provided a method for inflating an airbag device including igniting a first gas generating agent and thus generating a combustion gas by a gas generator, the gas generator including the first gas generating agent and an ignition unit configured to ignite the first gas generating agent, starting inflation of a bag-shaped portion upon receiving supply of the combustion gas generated by ignition, in an airbag device including an airbag, the airbag including an inflow portion connected to the gas generator, the inflow portion being configured to cause the combustion gas supplied from the gas generator to flow into an internal space of the airbag, the bag-shaped portion that is a bag-shaped member configured to separate, from an outside, the internal space into which the combustion gas flows from the inflow portion, the bag-shaped portion being configured to be in a folded state before receiving the supply of the combustion gas and to be in an inflated state upon receiving the supply of the combustion gas, and a second gas generating agent disposed at a predetermined position on an inner surface of the bag-shaped portion, and generating gas from the second gas generating agent disposed in the bag-shaped portion by using thermal energy of the combustion gas without accompanying a combustion reaction.

Advantageous Effects

According to the present disclosure, it is possible to provide a technique that improves reliability of an airbag device.

DESCRIPTION OF EMBODIMENTS

Airbag devices according to embodiments of the present disclosure will be hereinafter described with reference to the drawings. Note that each of configurations, combinations thereof, and the like in the embodiments are an example, and various additions, omissions, substitutions, and other changes of the configurations may be made as appropriate without departing from the spirit of the present disclosure. The present disclosure is not limited by the embodiments and is limited only by the claims.

First Embodiment

Figure 1:
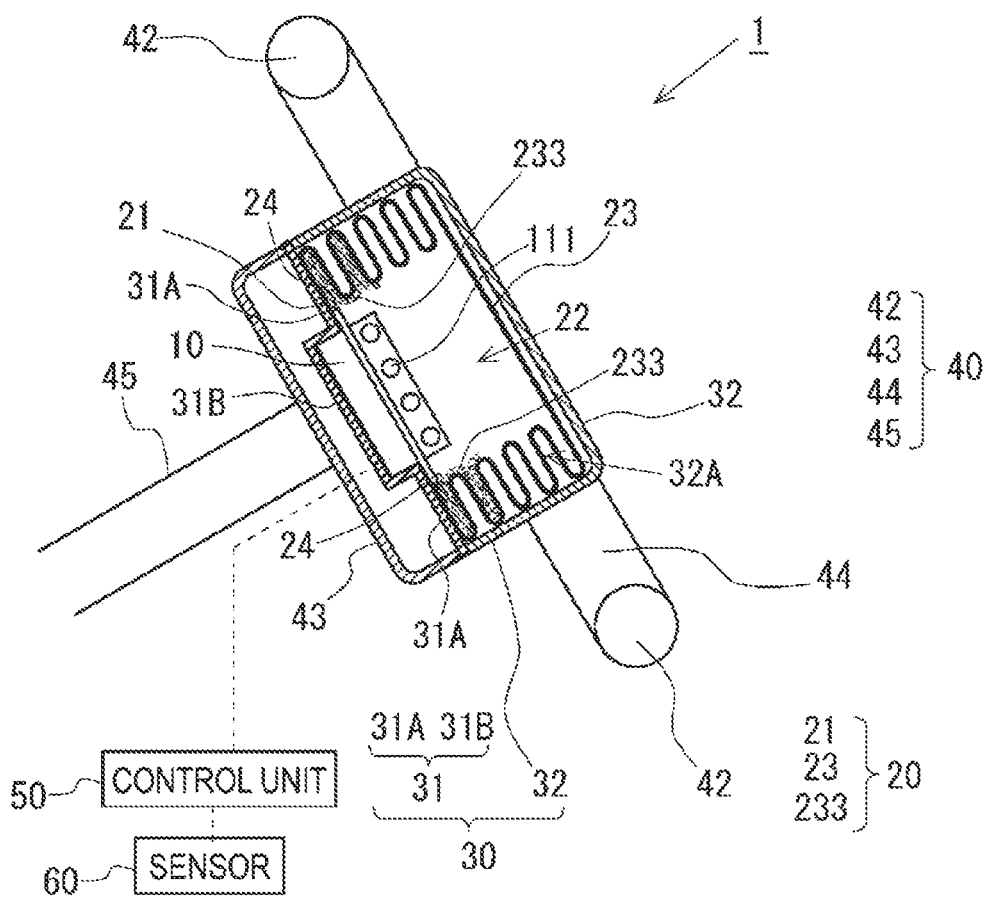
FIG. 1 is a schematic configuration diagram of an airbag device according to a first embodiment.

FIG. 1 is a schematic configuration diagram of an airbag device 1 according to the present embodiment. The airbag device 1 is provided in a vehicle, for example, and causes an airbag 20 to inflate and thus protects an occupant at the time of collision of the vehicle. In addition to this, the airbag device 1 may be provided outside the vehicle (for example, around a hood) and thus protect a pedestrian. Alternatively, the airbag device 1 may be provided to a bicycle, a motorcycle, an amusement vehicle (a roller coaster, a go-cart, or the like), or a driver or an occupant thereof. Further, the airbag device 1 may be worn by a pedestrian. FIG. 1 illustrates an example of a so-called airbag device for a driver's seat, and the airbag device is attached to a steering wheel 40 of a vehicle.

Figure 2:
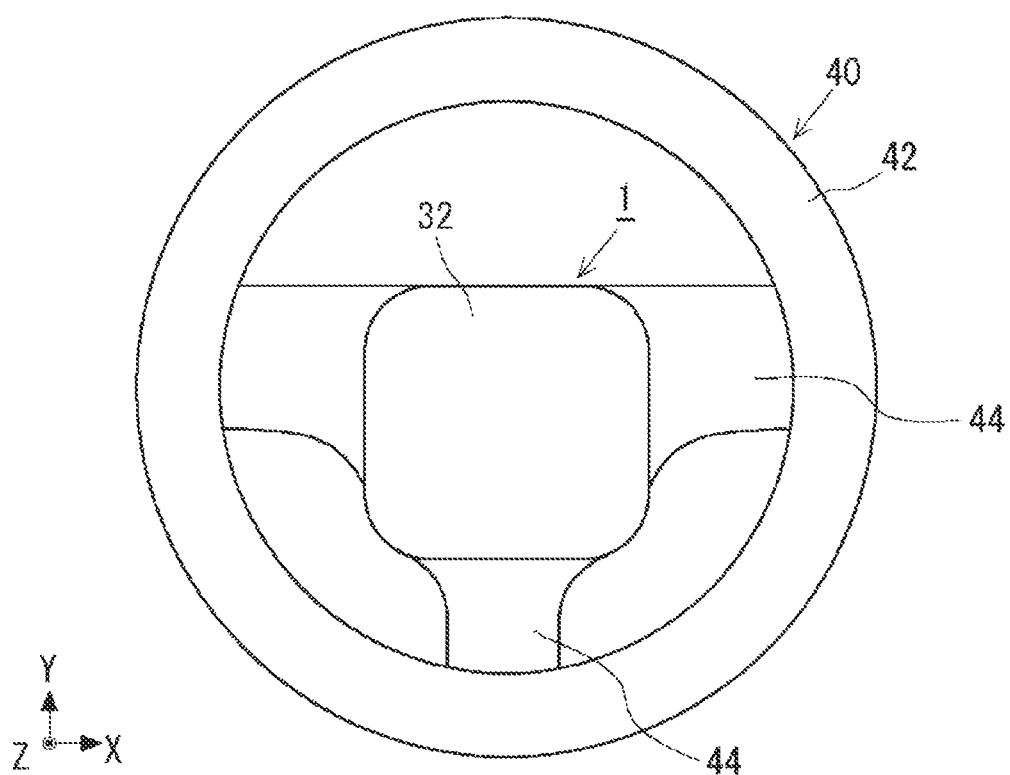
FIG. 2 is a front view illustrating a state before actuation of the airbag device attached to a steering wheel.
Figure 3:
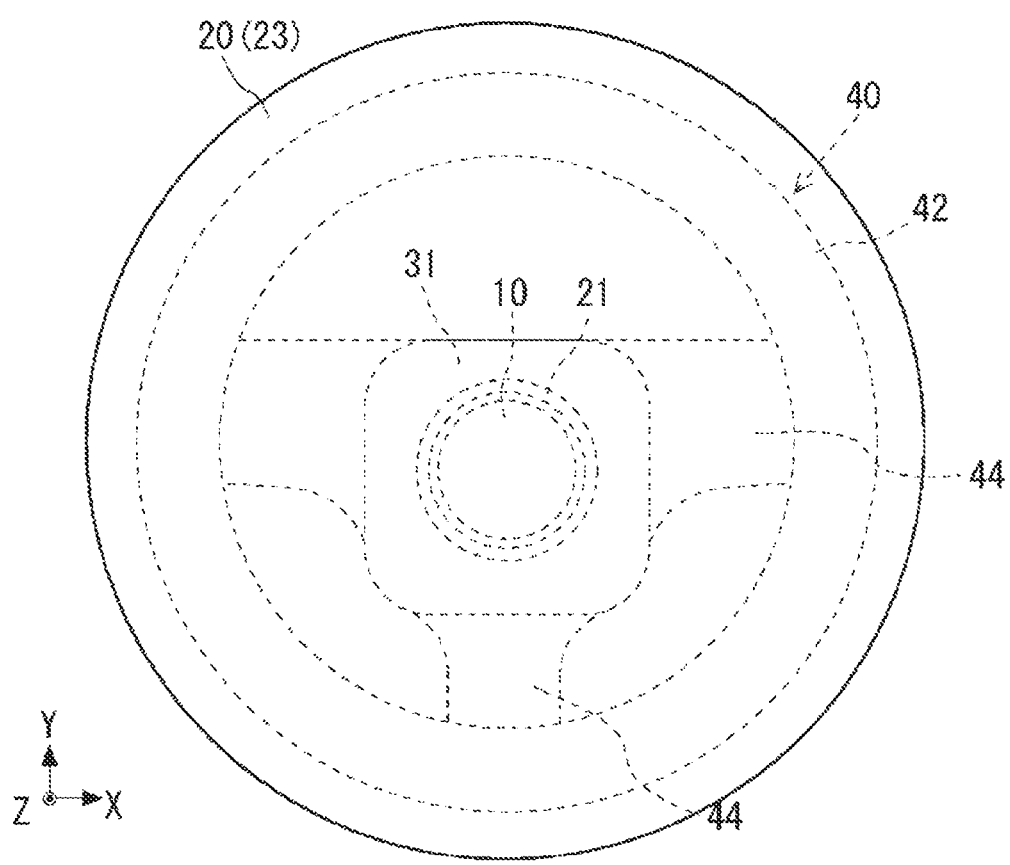
FIG. 3 is a front view illustrating an actuated state of the airbag device attached to the steering wheel.
Figure 4:
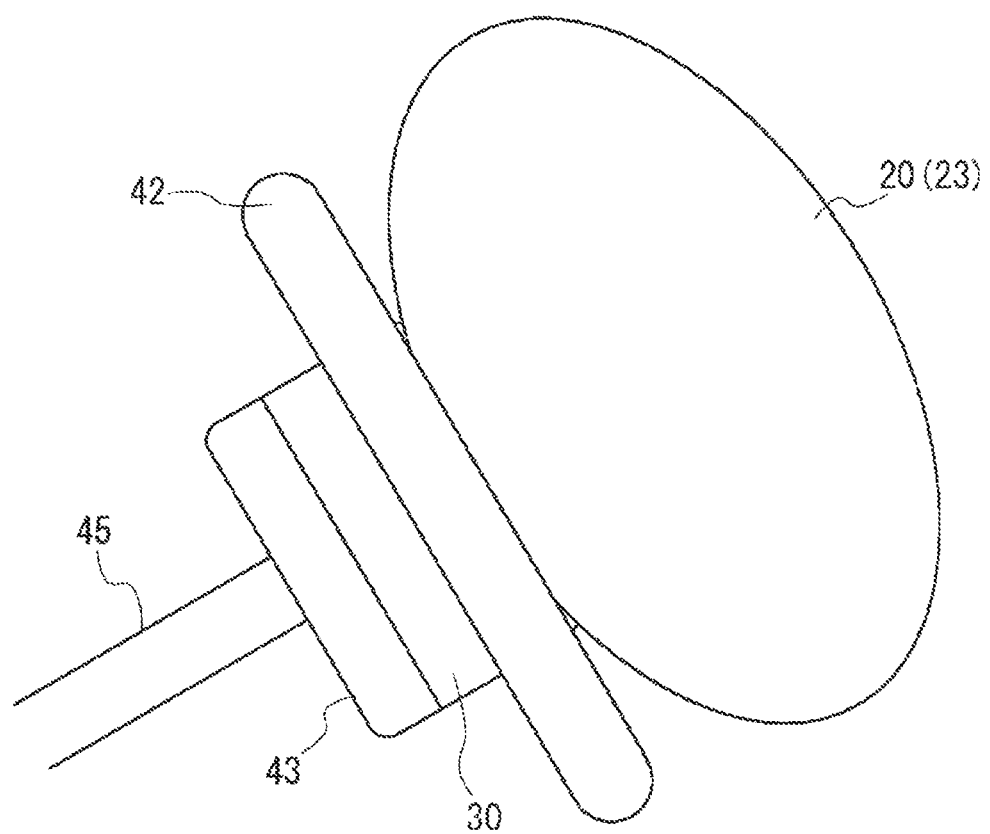
FIG. 4 is a side view illustrating the actuated state of the airbag device attached to the steering wheel.
Figure 5:
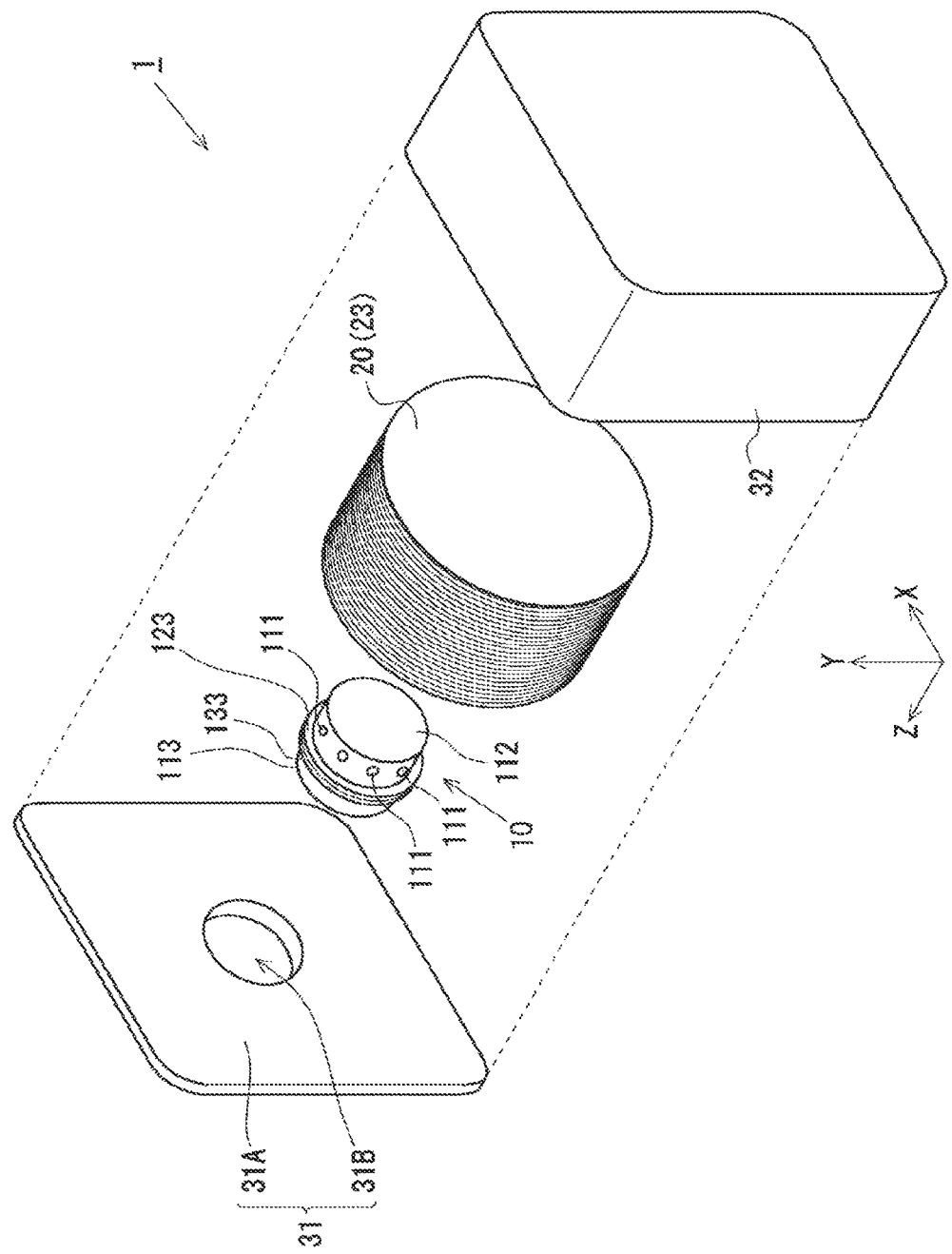
FIG. 5 is an exploded perspective view of the airbag device.

FIG. 2 is a front view illustrating a state before actuation of the airbag device 1 attached to the steering wheel 40, FIG. 3 is a front view illustrating an actuated state of the airbag device 1 attached to the steering wheel 40, FIG. 4 is a side view illustrating the actuated state of the airbag device 1 attached to the steering wheel 40, and FIG. 5 is an exploded perspective view of the airbag device 1. In FIG. 1 to FIG. 5, the up-down direction is indicated as a Y direction, the left-right direction is indicated as an X direction, and the front-rear direction is indicated as a Z direction. These directions are indicated as an example for convenience of description, and the configuration of the airbag device 1 is not limited thereto. For example, a direction in which the airbag device 1 is disposed is not limited to the illustrated direction. The same applies to the subsequent drawings.

The steering wheel 40 includes a steering wheel ring 42 having a ring shape and configured to be gripped by an occupant (driver) at the time of steering and thus to be rotated in a steering direction, a boss portion 43 positioned at a rotation center, and a spoke 44 connecting the boss portion 43 and the steering wheel ring 42. The boss portion 43 is attached to an end portion, on an occupant side, of a rotation center shaft (steering column) 45 connected to a steering mechanism of the vehicle, and transmits an operation of the steering wheel ring 42 by the driver to the rotation center shaft 45.

The airbag device 1 is attached to a driver side of the boss portion 43. That is, the airbag device 1 is disposed between the steering wheel 40 and the driver at the rotation center of the steering wheel 40. This airbag device 1 is provided with a gas generator 10 configured to generate gas at the time of activation, the airbag 20 configured to inflate upon receiving the supply of the gas, and an outer shell case 30.

The outer shell case 30 includes a holding base 31 configured to hold the gas generator 10 and the airbag 20, and a cover member 32 attached to the driver side of the holding base 31. The holding base 31 includes a base plate portion 31A formed in a shape similar to that of the boss portion 43 in a front view, and a recessed portion 31B having a circular shape. The recessed portion 31B is fitted with the gas generator 10 substantially at the center of the base plate portion 31A. The holding base 31 holds the gas generator 10 and the airbag 20 by fitting the gas generator 10 into the recessed portion 31B and thus fixing the gas generator 10 to the base plate portion 31A, and fixing, to the base plate portion 31A, an inflow port portion of the airbag 20 configured to inflate by inflow of the gas from the gas generator 10.

The cover member 32 is attached to the holding base 31, and thus covers the airbag 20 held by the holding base 31. In other words, when the cover member 32 is attached to the holding base 31, an accommodating space 32A is formed inside the outer shell case 30 formed by the holding base 31 and the cover member 32, and the gas generator 10 and the airbag 20 are accommodated in the accommodating space. The cover member 32 is made of a synthetic resin or the like, and is provided at a predetermined position with a rupture line (not illustrated) formed to be weaker than the other portions.

Gas Generator

Figure 6:
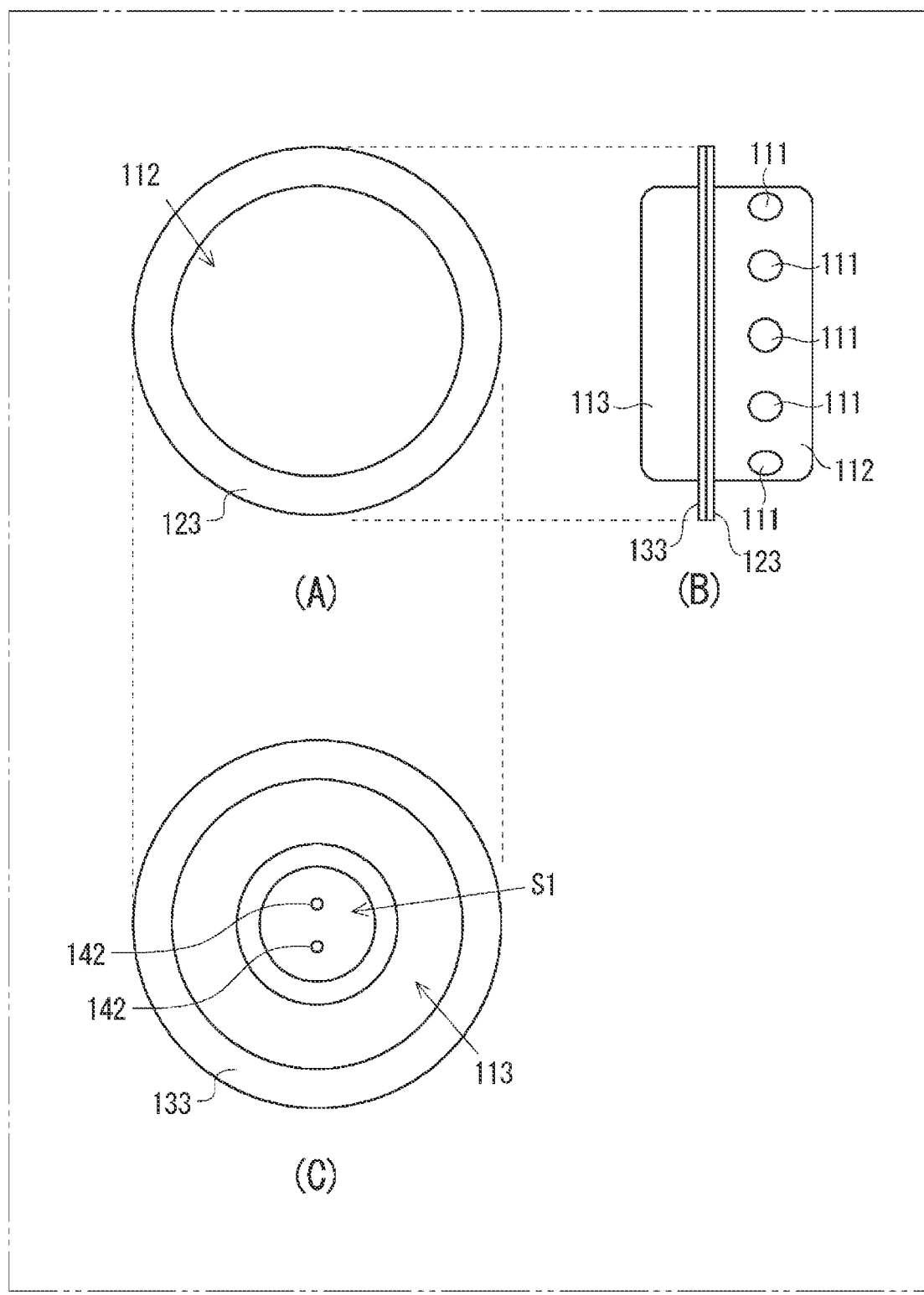
FIG. 6 is an external view of a gas generator.
Figure 7:
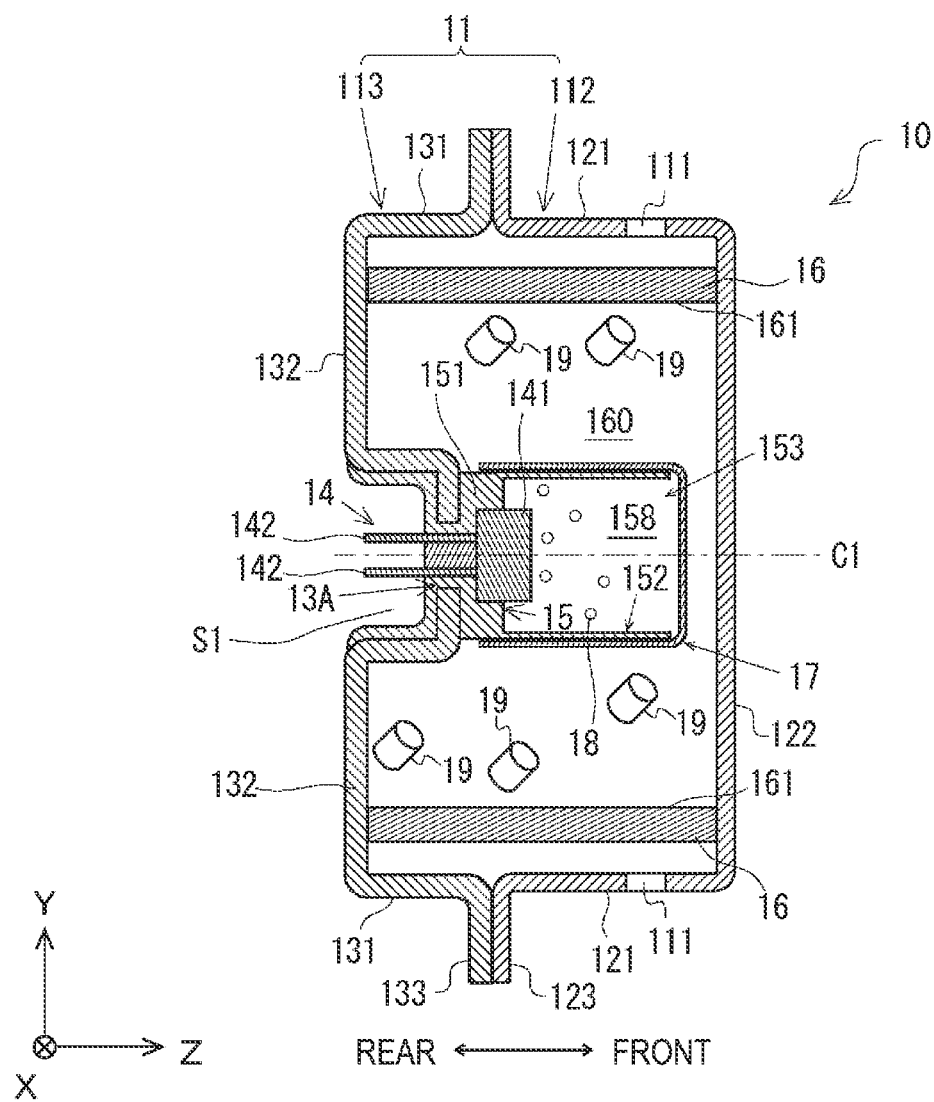
FIG. 7 is a cross-sectional view in a depth direction of the gas generator.

FIG. 6 is an external view of the gas generator 10. FIG. 6(A) is a front view of the gas generator 10, FIG. 6(B) is a side view of the gas generator 10, and FIG. 6(C) is a rear view of the gas generator 10. FIG. 7 is a lateral cross-sectional view taken along a depth direction of the gas generator 10. The gas generator 10 includes a housing 11, an igniter 14, a resin-made holding portion 15, a filter 16, a cup-shaped cover body 17, a transfer charge 18, a gas generating agent 19, and the like. The gas generator 10 is configured to combust the gas generating agent (a first gas generating agent) 19 by activating the igniter 14, and then to discharge a combustion gas as a combustion product from a gas discharge port 111 formed in the housing 11. Hereinafter, each configuration of the gas generator 10 will be described.

The housing 11 is an outer shell container made of a metal and configured to accommodate each of the components constituting the gas generator 10, and includes a front shell 112 and a rear shell 113. Each of the front shell 112 and the rear shell 113 is formed into a substantially cylindrical shape having a bottom, and the housing 11 is formed as a short cylindrical outer shell container in which both ends in a center axis C1 direction are closed by joining the front shell 112 and the rear shell 113 with their opening ends facing each other. The front shell 112 and the rear shell 113 can be formed by, for example, pressing a stainless steel plate.

Inside the housing 11, the igniter 14, the filter 16, the cup-shaped cover body 17, the transfer charge 18, the gas generating agent 19, and the like are disposed. Additionally, a combustion chamber 160 is formed inside the housing 11, and the gas generating agent 19 is accommodated in the combustion chamber 160. Here, in a direction along the center axis C1 direction of the housing 11, the front shell 112 side (that is, the right side in FIG. 7) is defined as the front side (front face side) of the gas generator 10, and the rear shell 113 side (that is, the left side in FIG. 7) is defined as the rear side of the gas generator 10.

The front shell 112 includes a front peripheral wall portion 121 with a tubular shape and a front wall portion 122 closing a front end of the front peripheral wall portion 121. In the front shell 112, the front wall portion 122 has a substantially circular shape in a plan view, and a rear end portion of the front peripheral wall portion 121 is formed as an open end. Further, a joining portion 123 extending outward in a radial direction in a flange shape is provided at the rear end portion of the front peripheral wall portion 121 in the front shell 112. In addition, the rear shell 113 includes a rear peripheral wall portion 131 with a tubular shape and a rear wall portion 132 closing a rear end of the rear peripheral wall portion 131. In the rear shell 113, the rear wall portion 132 has a substantially circular shape in the plan view, and a front end portion of the rear peripheral wall portion 131 is formed as an open end. Further, a joining portion 133 extending outward in the radial direction in a flange shape is continuously provided at the front end portion of the rear peripheral wall portion 131. Additionally, an attachment hole 13A for attaching the igniter 14 to the rear wall portion 132 is formed at the center of the rear wall portion 132 of the rear shell 113.

The joining portion 123 of the front shell 112 and the joining portion 133 of the rear shell 113 form the housing 11 by being overlapped with each other and joined by laser welding or the like. Further, in the front peripheral wall portion 121 of the front shell 112, a plurality of gas discharge ports 111 allowing an internal space and an external space of the housing 11 to communicate with each other are formed side by side along a circumferential direction.

The igniter 14 is fixed to the attachment hole 13A formed at the rear wall portion 132 of the rear shell 113 by using the resin-made holding portion 15. The igniter 14 is an electric igniter including an ignition unit 141 accommodating an ignition charge inside a cup body made of a metal, a pair of electro-conductive pins 142 and 142, and the like. The pair of electro-conductive pins 142 and 142 are supplied with an ignition current for igniting the ignition charge accommodated in the cup body. The base end sides of the pair of electro-conductive pins 142 and 142 are electrically insulated by the resin-made holding portion 15 and inserted into the cup body. Additionally, a bridge wire (resistor) provided inside the cup body is laid across the base ends of the pair of electro-conductive pins 142 and 142, and thus the base ends of the pair of electro-conductive pins 142 and 142 are coupled. The bridge wire may be, for example, a nichrome wire. Further, examples of the ignition charge include ZPP (zirconium/potassium perchlorate), ZWPP (zirconium/tungsten/potassium perchlorate), THPP (titanium hydride/potassium perchlorate), and lead tricinate. Note that the ignition charge is accommodated inside the cup body in contact with the bridge wire.

When the igniter 14 is activated, the bridge wire is heated by the ignition current supplied to the pair of electro-conductive pins 142 and 142. As a result, the ignition charge accommodated inside the cup body of the igniter 14 is ignited and combusted, and thus a combustion product (for example, flame) is produced. Then, an internal pressure of the cup body increases together with the combustion of the ignition charge, the cup body ruptures, and the combustion product is discharged from the ruptured place of the cup body. In addition, parts of the pair of electro-conductive pins 142 and 142 of the igniter 14 are disposed in an exposed manner to a connector insertion space S1 formed outside the housing 11 through the attachment hole 13A. The connector insertion space S1 is a space for inserting an external connector, and is formed by a part of the resin-made holding portion 15. When the airbag device 1 is attached to the boss portion of the steering wheel 40, an external connector (not illustrated) connected to a control unit 50 on the vehicle side is inserted into the connector insertion space S1, which electrically connects the igniter 14 and the control unit 50 to each other. When the control unit 50 detects collision of the vehicle and activates the airbag device 1, an ignition current is supplied from the control unit to the electro-conductive pins 142 and 142 through the external connector, which activates the igniter 14.

The resin-made holding portion 15 includes a base portion 151 having a circular columnar shape and fixing the igniter 14 to the rear wall portion 132 of the rear shell 113, an inner tubular wall portion 152 having a cylindrical shape and extending upward from the base portion 151 toward the front wall portion 122, and the like.

The inner tubular wall portion 152 is erected forward from the front surface of the base portion 151, and a transfer chamber 158 accommodating the transfer charge 18 is formed inside the inner tubular wall portion 152. The inner tubular wall portion 152 is disposed in a manner to surround the periphery of the ignition unit 141 of the igniter 14. Thus, the transfer chamber 158 formed inside the inner tubular wall portion 152 is formed in a manner to face the ignition unit 141 of the igniter 14. When the gas generator 10 is manufactured, the transfer chamber 158 can be filled with the transfer charge 18 from a front end opening 153 of the inner tubular wall portion 152. Then, the cup-shaped cover body 17 is externally inserted from the opening end side of the inner tubular wall portion 152, which seals the transfer charge 18 in the transfer chamber 158. Note that each of the inner tubular wall portion 152 and the cup-shaped cover body 17 is made of resin and can easily melt or rupture when the transfer charge 18 in the transfer chamber 158 is combusted.

The filter 16 has a cylindrical shape, for example, and is disposed concentrically with the housing 11. The filter 16 can be formed, for example, by radially stacking plain-knitted wire meshes made of stainless steel and compressing the plain-knitted wire meshes in the radial and axial directions. The cup-shaped cover body 17 attached to the inner tubular wall portion 152 is disposed inside the housing 11 with a space from the filter 16, and the combustion chamber 160 accommodating the gas generating agent 19 is formed of an annular space formed between an inner circumferential surface 161 of the filter 16 and the cup-shaped cover body 17. A combustion temperature of the gas generating agent 19 can be set, for example, within a range from 1000 to 1700° C. As such a gas generating agent 19, a known agent containing, for example, guanidine nitrate (41 wt. %), basic copper nitrate (49 wt. %), a binder, and an additive can be used. Further, the gas generating agent 19 may have a variety of shapes, such as a granular shape, a pellet shape, a circular columnar shape, and a disk shape.

As illustrated in FIG. 7, the filter 16 is assembled inside the housing 11 in a state in which a front end surface and a rear end surface of the filter 16 respectively abut on an inner wall surface of the front wall portion 122 of the front shell 112 and an inner wall surface of the rear wall portion 132 of the rear shell 113 and the filter 16 is compressed in the axial direction. The filter 16 has a function of filtering the combustion gas by collecting a combustion residue contained in the combustion gas.

Airbag

The airbag 20 is accommodated in a folded state inside the outer shell case 30. When the airbag 20 is supplied with gas from the gas generator 10, the airbag 20 expands, and ruptures the cover member 32 of the outer shell case 30, and then inflates on the front side of the airbag device 1.

Figure 8:
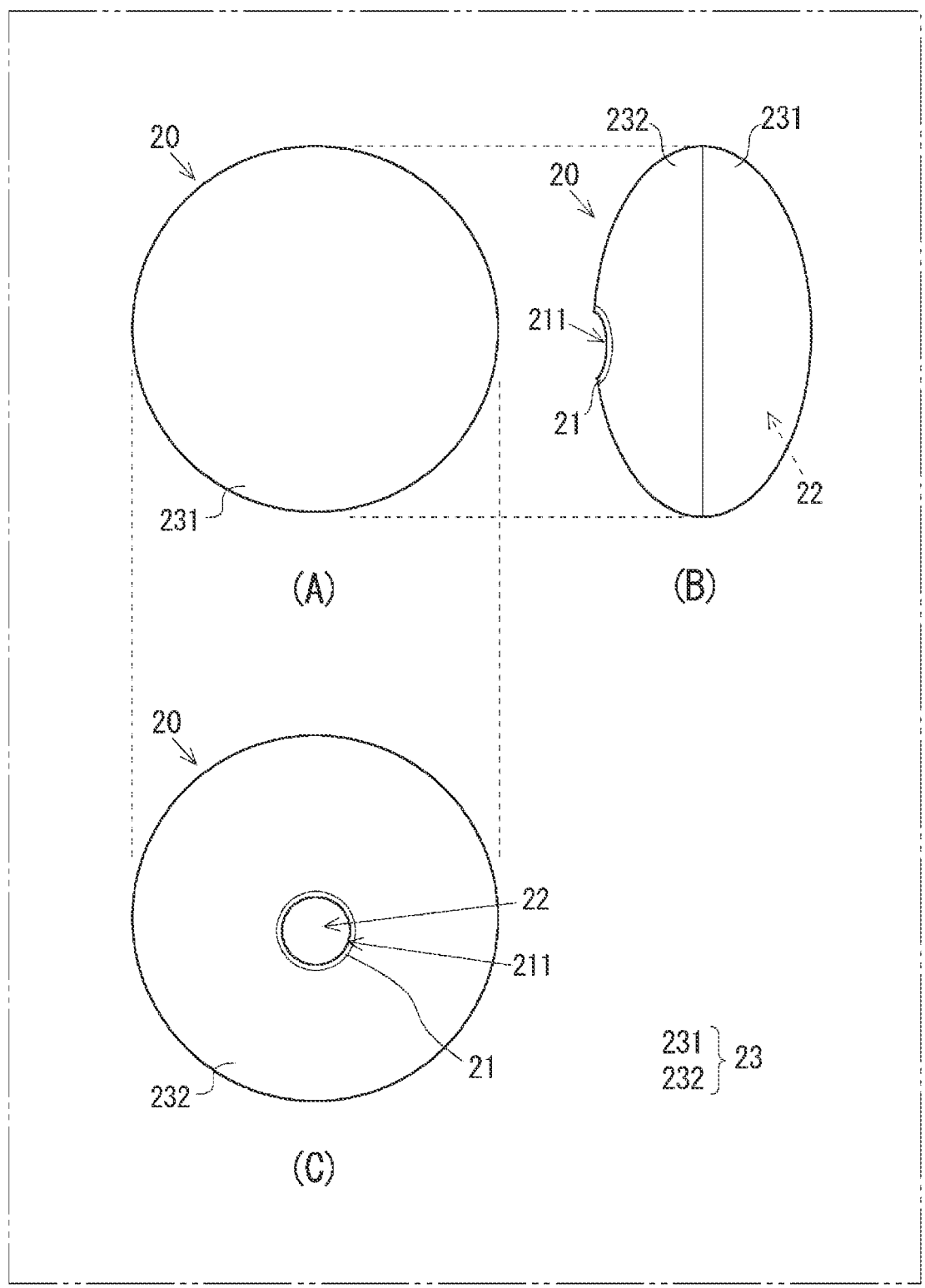
FIG. 8 is a diagram illustrating an airbag in an inflated state.

FIG. 8 is a diagram illustrating the airbag 20 in an inflated state. FIG. 8(A) illustrates a front surface of the airbag 20, FIG. 8(B) illustrates a side surface of the airbag 20, and FIG. 8(C) illustrates a rear surface of the airbag 20. The airbag 20 includes the inflow portion 21 configured to receive the supply of the combustion gas, and the bag-shaped portion 23 configured to separate, from the outside, the internal space 22 into which the combustion gas flows from the inflow portion 21. The bag-shaped portion 23 is formed in a bag shape by joining outer peripheral edges of a front side sheet 231 and a rear side sheet 232 both of which have circular outer shapes, together. The front side sheet 231 and the rear side sheet 232 are formed of a flexible material in a foldable manner. For example, each of the front side sheet 231 and the rear side sheet 232 may be a sheet made of a synthetic resin such as polyamide, nylon, or polyester, a woven fabric, a woven fabric covered with a synthetic resin, or the like.

The bag-shaped portion 23 is formed in a bag shape, and limits the entering and exiting of the gas at a portion other than predetermined inlet and outlet ports. Thus, the bag-shaped portion 23 expands when the gas is supplied to the internal space 22 and functions as an air cushion. The inflow portion 21 is one of the inlet and outlet ports of the gas in the airbag 20. As illustrated in FIG. 8(C), the inflow portion 21 is provided at a central portion of the rear side sheet 232, and includes an opening 211 into which a front end portion of the gas generator 10 configured to supply the combustion gas is inserted. The bag-shaped portion 23 may include a vent hole configured to discharge excessive gas as the inlet and outlet ports of the gas.

As illustrated in FIG. 1, the airbag 20 is attached to the holding base 31 by fixing the inflow portion 21 to the holding base 31 of the outer shell case 30 by a retainer 24. The retainer 24 is an annular metal plate, abuts against the inflow portion 21 from the inside of the bag-shaped portion 23, and is fastened to the holding base 31 with screws or the like in a state where the inflow portion 21 is sandwiched between the retainer 24 and the holding base 31. At the time of attaching the airbag 20, the bag-shaped portion 23 is folded as illustrated in FIG. 1, and the cover member 32 is attached to the holding base 31, and thus covers the bag-shaped portion 23. That is, in an initial state before the airbag device 1 is activated, the airbag 20 is accommodated in the outer shell case 30 in the folded state.

In addition, in the airbag 20, a second gas generating agent 233 is disposed at a predetermined position on the inner surface of the bag-shaped portion 23. When the combustion gas is supplied from the gas generator 10, the second gas generating agent 233 generates gas by using thermal energy of the combustion gas without accompanying a combustion reaction. The second gas generating agent 233 is, for example, a substance (hereinafter, also referred to as a sublimable substance) that is solid at a room temperature and is sublimated by the heat of the combustion gas, and then becomes gas. Examples of the sublimable substance include naphthalene (having a sublimation point of 209° C.), terephthalic acid (having a sublimation point of 333° C.), and biphenyl-4,4-diol (having a sublimation point lower than 300° C.). Note that a sublimable substance has a sublimation point that is a reaction temperature (gas generation temperature), for example. Additionally, the second gas generating agent 233 may be, for example, a substance (hereinafter, also referred to as a vaporization substance) that is solid or liquid at a room temperature and that is vaporized by the heat of the combustion gas and then becomes gas.

Further, the second gas generating agent 233 may be a substance (hereinafter, also referred to as a thermal decomposition substance) that is solid or liquid at a room temperature, and the substance is decomposed by the heat of the combustion gas and then at least a part of the substance becomes gas. Examples of the thermal decomposition substance include sodium hydrogen carbonate and aliphatic polycarbonate (APC). Sodium hydrogen carbonate is decomposed at a reaction temperature (gas generation temperature) of about 270° C. and generates $CO_2$ and $H_2O$ as gas components. On the other hand, aliphatic polycarbonate is decomposed at about 230° C. and generates $H_2O$ and $CO_2$ as gas components.

In the present embodiment, as illustrated in FIG. 1, the second gas generating agent 233 is disposed at a position facing a gas discharge port 111 of the gas generator 10 in the bag-shaped portion 23 in the folded state.

Control Device

The control unit 50 detects a state of the vehicle or a state around the vehicle by using a sensor 60, determines whether or not to actuate the airbag device 1 based on the detection result, and supplies an ignition current to the airbag device 1 when the airbag device 1 is determined to be actuated.

The sensor 60 is, for example, an impact sensor configured to detect collision of the vehicle. Note that the sensor 60 is not limited to a sensor that detects an impact, and may be a sensor that detects information around the vehicle and thus predicts collision to the vehicle. The sensor 60 may include, for example, a sensing unit such as an acceleration sensor, a gyro sensor (angular velocity sensor), a positioning device, a camera, a radar, light detection and ranging, laser imaging detection and ranging (LIDAR), or a three-dimensional scanner. Examples of the positioning device may include a satellite positioning system such as a global positioning system (GPS). The radar and the LIDAR obtain a distance to an object existing around the vehicle and a moving speed of the object.

The control unit 50 obtains a detection result by the sensor 60, and when the detection result satisfies a predetermined condition, the control unit 50 supplies an ignition current and thus actuates the airbag device 1 as will be described later.

Inflation Method

Figure 9:
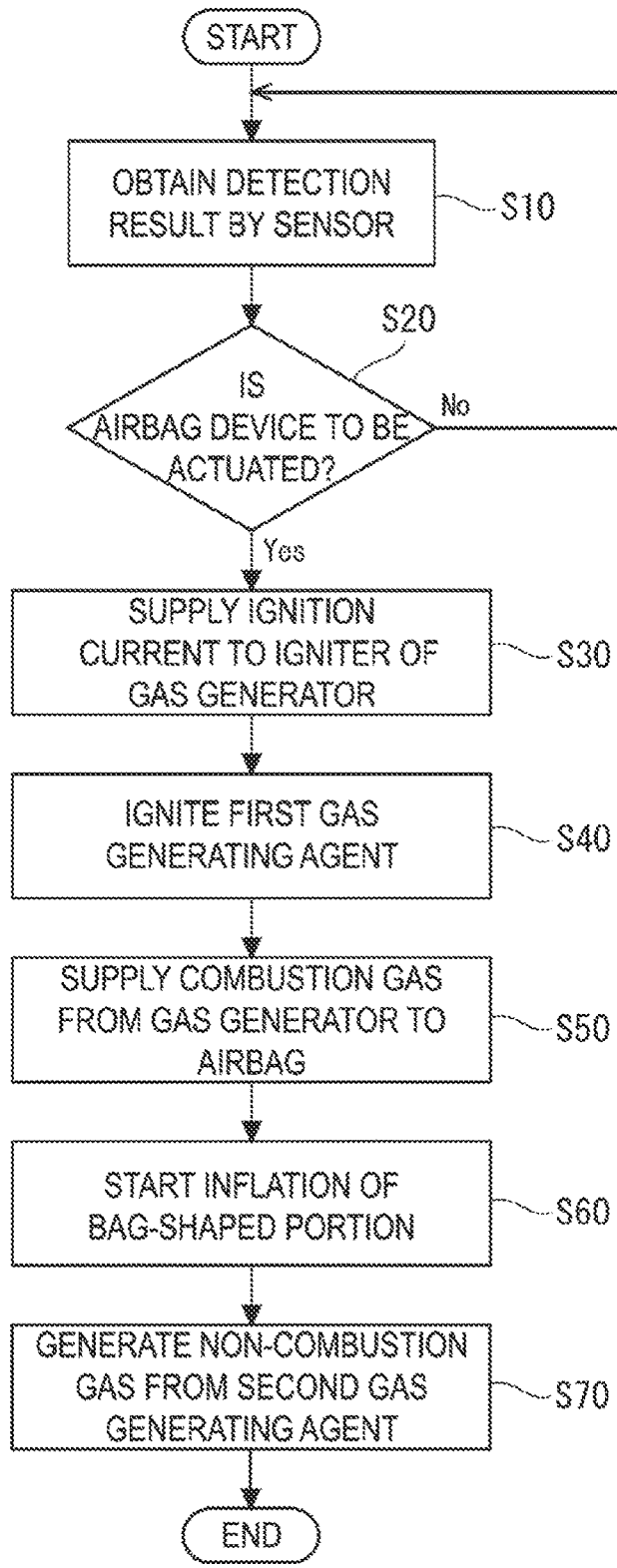
FIG. 9 is an explanatory view of a process of inflating the airbag of the airbag device.

FIG. 9 is an explanatory view of a process of inflating the airbag 20 of the airbag device 1. When power supply is turned on by turning on an ignition power supply in the vehicle or the like, the control unit 50 obtains the detection result by the sensor 60 (step S10) and determines whether or not to actuate the airbag device 1 (step S20). Here, when the detection result satisfies the predetermined condition, such as a case where the detection result of the sensor 60 is equal to or greater than a predetermined value or a case where collision has been predicted based on a moving direction of a surrounding object (another vehicle or the like) and a moving direction of the own vehicle, the control unit 50 determines that the airbag device 1 is to be actuated (step S20, Yes), and when the detection result does not satisfy the predetermined condition, the control unit 50 determines that the airbag device 1 is not to be actuated (step S20, No).

When the control unit 50 determines that the airbag device 1 is to be activated, the control unit 50 supplies an ignition current to the electro-conductive pins 142 and 142 of the igniter 14 of the gas generator 10 (step S30). Then, the ignition charge accommodated in the cup body of the ignition unit 141 in the igniter 14 is combusted, and the cup body ruptures. As a result, the transfer charge 18 is ignited and combusted by flame, high-temperature gas, or the like discharged from the ignition unit 141. When the transfer charge 18 is combusted, a temperature and an internal pressure in the transfer chamber 158 are rapidly increased, and the inner tubular wall portion 152 and the cup-shaped cover body 17 melt or rupture by the energy, and thus a combustion product (flame or high-temperature gas) is discharged from the transfer chamber 158 to the combustion chamber 160. Then, the combustion product comes into contact with the gas generating agent 19 accommodated in the combustion chamber 160, which ignites the gas generating agent 19 (step S40).

The high-temperature and high-pressure combustion gas generated by the combustion of the gas generating agent 19 in the combustion chamber 160 passes through the filter 16, and is discharged from the gas discharge port 111 to the outside of the housing 11. That is, the combustion gas is supplied from the gas generator 10 into the bag-shaped portion 23 of the airbag 20 (step S50).

When the combustion gas is supplied to the internal space 22, the bag-shaped portion 23 expands and starts to inflate (step S60). Then, the second gas generating agent 233 disposed on the inner surface of the bag-shaped portion 23 generates gas (non-combustion gas) without accompanying a combustion reaction by using the thermal energy of the combustion gas (step S70). Thus, the combustion gas from the gas generator 10 and the gas generated by the second gas generating agent 233 (hereinafter, also referred to as the non-combustion gas) cause the airbag 20 to inflate and function as a cushion, thus protecting the occupant.

As described above, in the present embodiment, after the combustion gas is supplied from the gas generator 10 (step S50), the second gas generating agent 233 generates the non-combustion gas by using the thermal energy of the combustion gas (step S70). That is, the combustion gas is supplied at a timing earlier by a predetermined period of time than a timing when the non-combustion gas is to be generated from the second gas generating agent 233. This difference between the timings can be adjusted by changing, for example, a position at which the second gas generating agent 233 is disposed (for example, a distance from the gas discharge port 111) or an amount of the second gas generating agent 233 to be disposed at each position. Further, the gas generation timing may be adjusted by selecting a substance to be employed as the second gas generating agent 233 according to a temperature at which the non-combustion gas is generated. For example, employing a substance having a low temperature at which the non-combustion gas is generated as the second gas generating agent 233 advances the gas generation timing, or employing a substance having a high temperature at which the non-combustion gas is generated as the second gas generating agent 233 delays the gas generation timing.

In addition, the timings from the start to the end of the supply of the non-combustion gas by the second gas generating agent 233, that is, the period of supplying the non-combustion gas may be adjusted. For example, the period of supplying the non-combustion gas can be shortened by employing a substance having a high reaction rate when the non-combustion gas is generated by heat as the second gas generating agent 233, and the period of supplying the non-combustion gas can be set to be long by employing a substance having a low reaction rate when the non-combustion gas is generated by heat as the second gas generating agent 233. In addition, the period of supplying the non-combustion gas may be set to be short by thinly and widely providing the second gas generating agent 233, and the period of supplying the non-combustion gas may be set to be long by thickly and narrowly providing the second gas generating agent 233. Then, by adjusting the timings and the period of the supply, when the airbag 20 inflates, a pressure at the initial stage of inflation, a timing for completing the inflation, a period for maintaining a required pressure, and the like can be adjusted, and energy absorption (EA) characteristics can be appropriately set.

Figure 10:
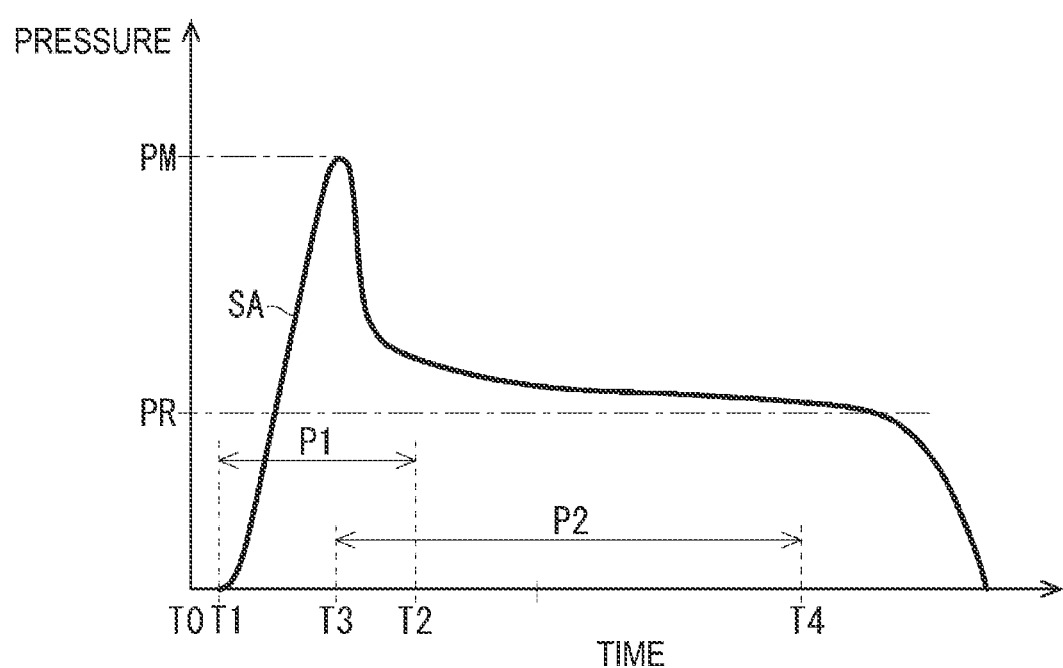
FIG. 10 is a diagram illustrating a relationship between timings of supplying a combustion gas and a non-combustion gas and a pressure in the bag-shaped portion.

FIG. 10 is a diagram illustrating a relationship between timings of supplying the combustion gas and the non-combustion gas and a pressure in the bag-shaped portion 23. In FIG. 10, the horizontal axis represents an elapsed period of time from the start of activation, the vertical axis represents the pressure, and a solid line SA represents the pressure in the bag-shaped portion 23. When an ignition current is supplied to the igniter 14 and the activation of the airbag device 1 is started (T0), the combustion gas is immediately supplied from the gas generator 10 by the combustion of the first gas generating agent. A timing of the start of supplying the combustion gas is T1, a timing of the end of the supply is T2, and a period (first period) of the supply is P1. Then, when the combustion gas is supplied, the non-combustion gas is supplied from the second gas generating agent 233 by using the thermal energy. A timing of the start of supplying the non-combustion gas is T3, a timing of the end of the supply is T4, and a period (second period) of the supply is P2. As illustrated in FIG. 10, in the present embodiment, the supply of the combustion gas is first started at the timing T1, and then the supply of the non-combustion gas is started at the timing T3. Further, the period P2 for supplying the non-combustion gas from the second gas generating agent 233 is set to be longer than the period P1 for supplying the combustion gas from the gas generator 10. Supplying the combustion gas and the non-combustion gas at different timings in this way can suppress a maximum pressure PM at the initial stage of the inflation low. Further, making the period P2 of supplying the non-combustion gas longer than the period P1 of supplying the combustion gas makes it possible to maintain a required pressure PR at which the airbag 20 functions as a cushion for a long time, and makes it possible to protect the occupant even when the airbag 20 receives a plurality of impacts due to multiple collisions or the like.

As described above, according to the airbag device 1 according to the present embodiment, since the gases are supplied from both the gas generator 10 and the second gas generating agent 233 disposed in the bag-shaped portion 23, the pressure and the supply amount of the combustion gas to be supplied from the gas generator 10 can be reduced. Further, the gas generator 10 itself can be reduced in size and weight. As a result, the pressure at the initial stage of the inflation can be reduced, and even when the occupant deviates from a specified seating position and is present near the airbag 20, an adverse effect on the occupant is suppressed, and reliability of the airbag device 1 can be improved.

In addition, in the airbag device 1 according to the present embodiment, the second gas generating agent 233 is disposed facing the gas discharge port 111. Thus, the combustion gas with a high temperature immediately after being discharged from the gas discharge port 111 comes into contact with the second gas generating agent 233. This allows the gas to be efficiently generated from the second gas generating agent 233. Further, at this time, since the second gas generating agent 233 consumes the heat of the combustion gas, an influence of the heat of the combustion gas on the bag-shaped portion 23 can be reduced, and the reliability of the airbag device 1 can be improved.

Furthermore, in the airbag device 1 according to the present embodiment, the combustion gas is supplied at the timing earlier by the predetermined period of time than the timing when the gas is to be generated from the second gas generating agent. As a result, appropriate EA characteristics can be obtained. For example, the pressure at the initial stage of the inflation can be reduced.

First Modification

Figure 11:
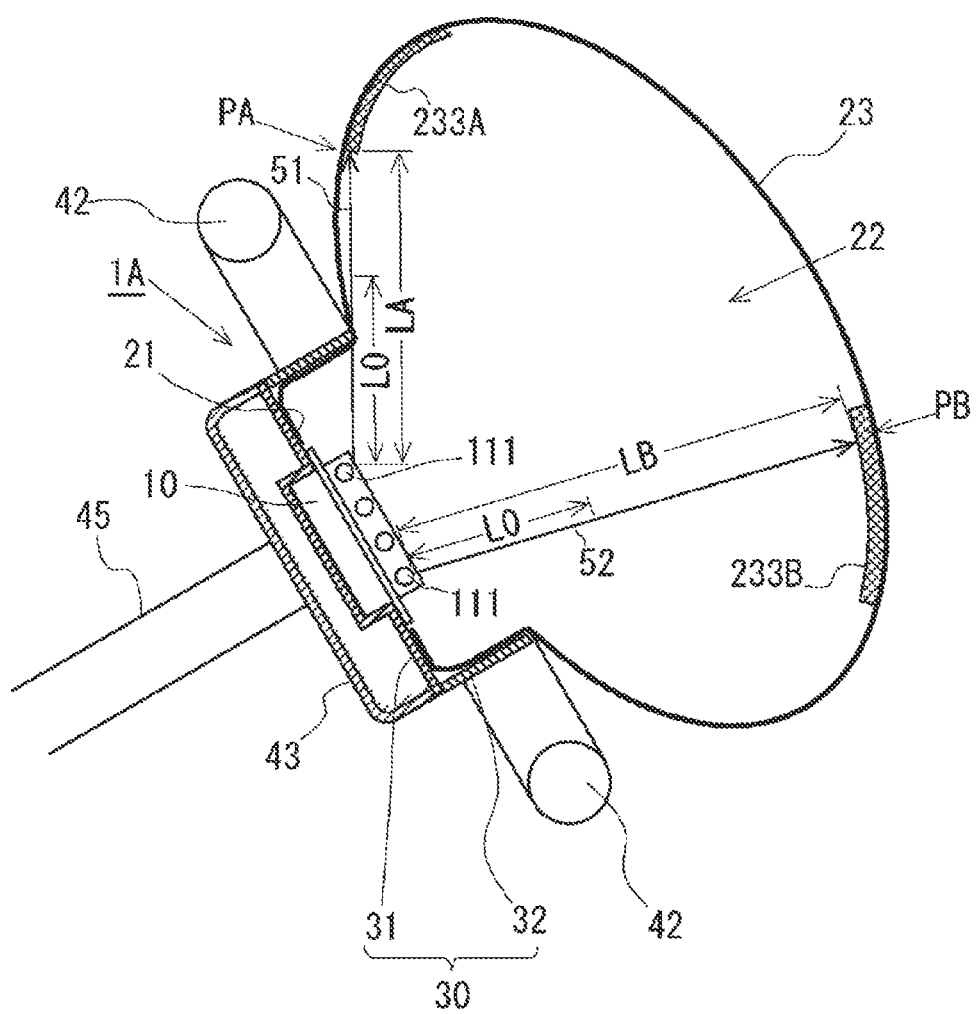
FIG. 11 is a diagram illustrating an airbag device according to a first modification.

FIG. 11 is a diagram illustrating an airbag device 1A according to a first modification. The airbag device 1A according to the present modification is different from that of the above-described embodiment in position where the second gas generating agent 233 is disposed. Note that since the other configurations thereof are the same as those of the above-described embodiment, the same elements are denoted by the same reference signs or the like and the description thereof will not be repeated.

In the present modification, as illustrated in FIG. 11, the second gas generating agent 233 is disposed at a position away from the gas discharge port 111 of the gas generator 10 in an inflating direction. Here, the inflating direction is a direction in which the airbag 20 inflates, and is a direction in which the second gas generating agent 233 flows from the gas discharge port 111 side before the inflation toward the position of the bag-shaped portion 23 at the time of completion of the inflation. FIG. 11 illustrates a state at the time of the completion of the inflation of the bag-shaped portion 23, and illustrates the fact that a second gas generating agent 233A moves in the inflating direction indicated by an arrow 51 as the airbag 20 inflates. As described above, in the present modification, the second gas generating agent 233A is disposed in a separated manner from the gas discharge port 111 of the gas generator 10 in the inflating direction. In this case, the gas discharge port 111 of the gas generator 10 and the second gas generating agent 233A are disposed in a dispersed manner. For example, the second gas generating agent 233A is disposed, and thus a distance LA from the gas discharge port 111 to a position PA of the second gas generating agent 233A is equal to or greater than a distance L0. Here, the distance L0 is, for example, a distance to be secured between the gas discharge port 111 and the second gas generating agent 233A at the time of the completion of the inflation, and by appropriately setting this value, the gas discharge port 111 as a gas generation source and the second gas generating agent 233A can be appropriately dispersed and disposed. Further, the second gas generating agent 233A may be disposed away from the gas discharge port 111 of the gas generator 10 in the inflating direction in the state where the airbag 20 is folded before the inflation, and the distance L0 may be a distance to be secured between the gas discharge port 111 and the second gas generating agent 233A in the state where the airbag 20 is folded. That is, the airbag 20 may be folded, and thus the second gas generating agent 233A may be disposed at a position where the second gas generating agent 233A does not directly face the gas discharge port 111, and the distance L0 may be secured between the gas discharge port 111 and the second gas generating agent 233A in the state before the inflation. Furthermore, the distance L0 may be a distance to be secured between the gas discharge port 111 and the second gas generating agent 233A in the middle of inflation of the airbag 20. Since the second gas generating agent 233A is disposed away from the gas discharge port 111 in the inflating direction in this manner, the airbag 20 performs inflation at the initial stage (until the airbag 20 opens to a half size or the like) by the combustion gas from the gas generator 10, and uses the non-combustion gas from the second gas generating agent 233A together with the combustion gas in the middle of the inflation. Note that the distance L0 may be set based on a size, a shape of the airbag 20, a difference between the timing T1 of the start of supplying the combustion gas and the timing T3 of the start of supplying the non-combustion gas, and the like.

Further, the second gas generating agent 233B moves in the inflating direction indicated by an arrow 52, and is disposed, and thus a shortest distance LB from the gas discharge port 111 to a position PB at the time of the completion of the inflation is equal to or longer than the predetermined distance L0. Note that since a plurality of gas discharge ports 111 are provided, a distance to the gas discharge port 111 having a shortest distance among the plurality of gas discharge ports 111, that is, the shortest distance is defined as the distances LA and LB.

As described above, in the present modification, the second gas generating agent 233 is disposed on the inner surface of the airbag 20 at a position away from the gas discharge port 111 by a predetermined distance in the inflating direction. As a result, the gas generation sources are disposed in a dispersed manner, and the gas is supplied not only from the gas discharge ports 111 but also from the second gas generating agents 233A and 233B disposed on the inflating direction side. This can reduce the pressure of the combustion gas to be supplied from the gas generator 10, suppress the pressure at the initial stage of the inflation, and improve the reliability of the airbag device.

Second Modification

Figure 12:
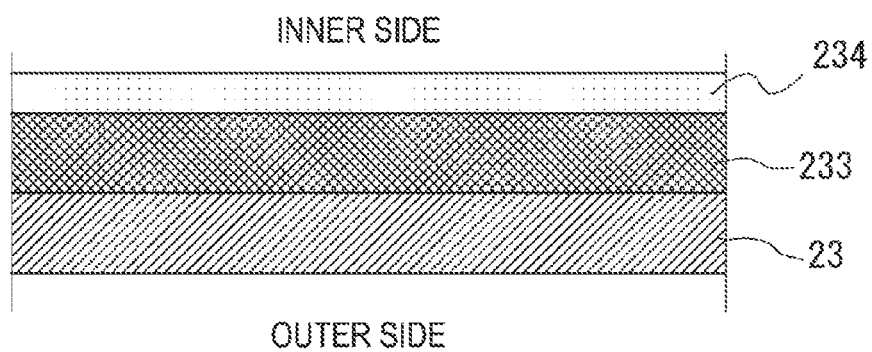
FIG. 12 is a diagram illustrating a configuration of an airbag according to a second modification.

FIG. 12 is diagram illustrating a configuration of the airbag 20 according to a second modification. An airbag device 1B according to the present modification is different from that of the above-described embodiment in that the second gas generating agent 233 is covered with a cover member. Note that since the other configurations thereof are the same as those of the above-described embodiment, the same elements are denoted by the same reference signs or the like and the description thereof will not be repeated.

In the present modification, as illustrated in FIG. 12, the second gas generating agent 233 is provided on the inner surface of the bag-shaped portion 23, and an inner surface of the second gas generating agent 233 is covered with a cover member 234. Thus, even when the supply of the combustion gas is started, the combustion gas does not come into direct contact with the second gas generating agent 233. However, since the non-combustion gas is supplied from the second gas generating agent 233 after the cover member 234 is exhausted by the combustion gas with a high temperature, a generation timing of the non-combustion gas can be delayed. Here, the exhaustion of the cover member 234 means that the cover member 234 no longer performs a function of covering the second gas generating agent 233. For example, the cover member 234 may be made of a material that melts due to the heat of the combustion gas, and may have a configuration where when the supply of the combustion gas is started and the cover member 234 melts, the combustion gas comes into contact with the second gas generating agent 233, and thus causes the non-combustion gas to be generated from the second gas generating agent 233. Alternatively, instead of melting, the heat of the combustion gas may be transmitted to the second gas generating agent 233 through the cover member 234, and the non-combustion gas may be generated from the second gas generating agent 233 and then rupture the cover member 234. Then, the timing of supplying the non-combustion gas can be arbitrarily selected and set by appropriately setting a melting temperature and a thickness of the cover member 234 and adjusting a period of time required for the exhaustion.

It should be noted that no such limitation is intended to the configuration in which the cover member 234 completely covers the second gas generating agent 233, and the cover member 234 may be provided, and thus cover at least a part of the second gas generating agent 233. That is, a configuration may be adopted in which the cover member 234 is provided on a part (for example, half) of the second gas generating agent 233 provided on the inner surface of the bag-shaped portion 23, and the cover member 234 is not provided on the other part. As a result, the non-combustion gas is generated first from a portion where the cover member 234 is not provided, and then the non-combustion gas is generated from a portion where the cover member 234 is provided. This allows a period of supplying the non-combustion gas to be extended as a whole.

As described above, according to the present modification, the timing and the period of supplying the non-combustion gas can be freely selected and set, and the EA characteristics can be appropriately set.

Third Modification

Figure 13:
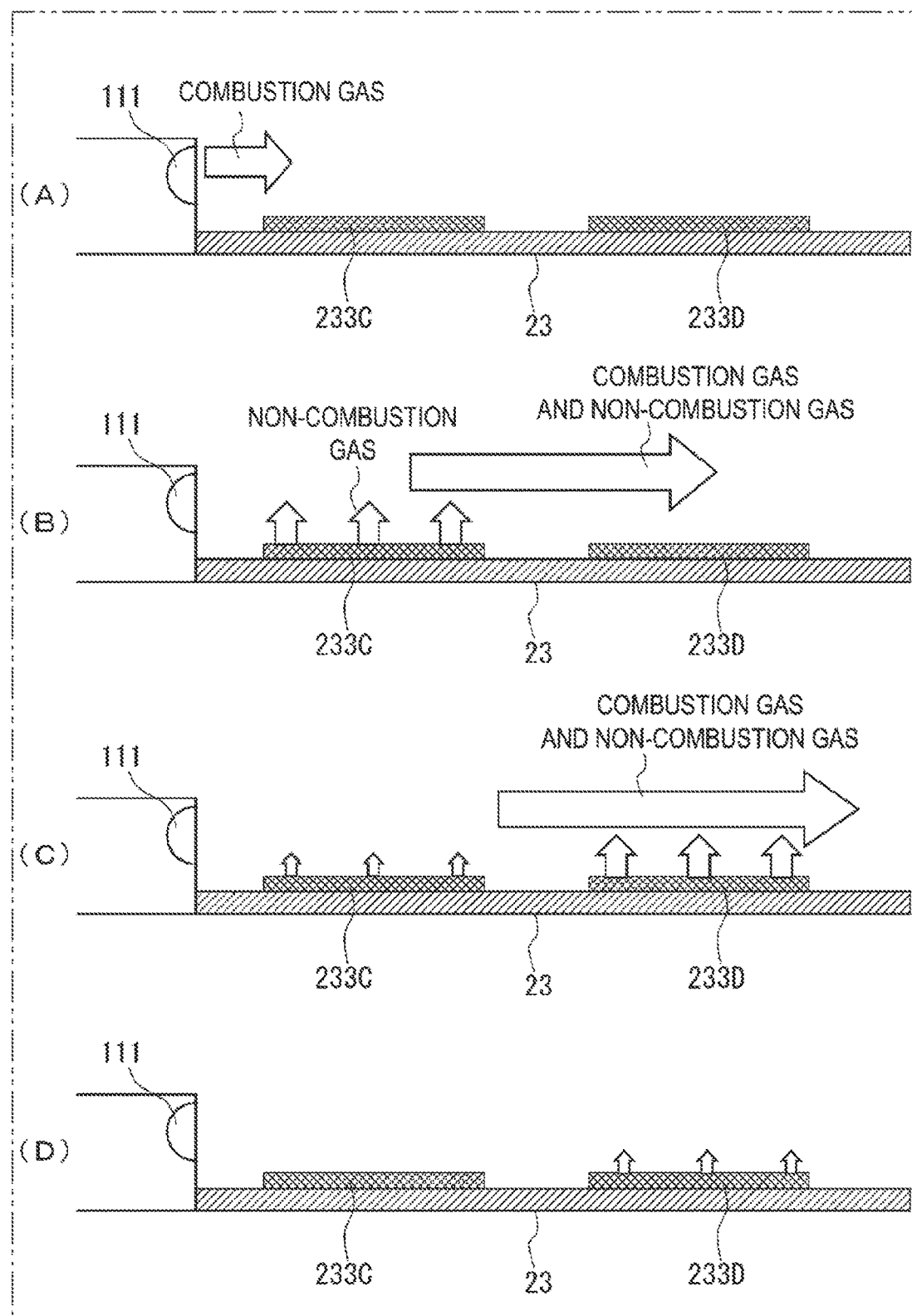
FIG. 13 is a diagram illustrating an airbag device according to a third modification.

FIG. 13 is diagram illustrating a configuration of the airbag 20 according to a third modification. An airbag device 1C according to the present modification is different from that of the above-described embodiment in that a plurality of types of second gas generating agents 233 having different temperatures at which the non-combustion gas is generated are provided. Note that since the other configurations thereof are the same as those of the above-described embodiment, the same elements are denoted by the same reference signs or the like and the description thereof will not be repeated.

In the present modification, as illustrated in FIG. 13, a second gas generating agent 233C and a second gas generating agent 233D are disposed at different positions on the bag-shaped portion 23. Here, the second gas generating agent 233C is a substance having a higher temperature at which the non-combustion gas is generated (hereinafter, also referred to as a gas generation temperature) than that of the second gas generating agent 233D. That is, the second gas generating agent 233D is a substance having a gas generation temperature lower than that of the second gas generating agent 233C. A material of the second gas generating agent 233D is not particularly limited, and may be a sublimable substance, a vaporization substance, or a thermal decomposition substance. For example, the second gas generating agent 233C may be terephthalic acid (having a gas generation temperature of 333° C.), and the second gas generating agent 233D may be naphthalene (having a gas generation temperature of 209° C.). Alternatively, the second gas generating agent 233C may be sodium hydrogen carbonate (having a gas generation temperature of 270° C.) and the second gas generating agent 233D may be aliphatic polycarbonate (having a gas generation temperature of 230° C.).

Further, the second gas generating agent 233C is disposed on an upstream side from the second gas generating agent 233D in a flow direction of the combustion gas discharged from the gas discharge port 111.

FIG. 13(A) illustrates a state immediately after the combustion gas is discharged from the gas discharge port 111. When the discharge of the combustion gas is started, the combustion gas first comes into contact with the second gas generating agent 233C, and the second gas generating agent 233C causes the non-combustion gas to be generated.

Next, as illustrated in FIG. 13(B), the non-combustion gas generated from the second gas generating agent 233C is mixed with the combustion gas and flows downstream. Thus, a temperature of mixed gas of the combustion gas and the non-combustion gas becomes lower than that of the original combustion gas. When the mixed gas reaches the second gas generating agent 233D, as illustrated in FIG.

13(C), the second gas generating agent 233D causes the non-combustion gas to be generated by utilizing thermal energy of the mixed gas.

Then, when the generation of the non-combustion gas by the second gas generating agent 233D is completed as illustrated in FIG. 13(D), the supply of the gas is stopped.

In this way, on the downstream side of the combustion gas, the temperature of the combustion gas drops due to mixture with the non-combustion gas, but according to the present modification, since the second gas generating agent 233D having the low gas generation temperature is disposed on the downstream side, the non-combustion gas can be efficiently generated without being affected by the temperature drop.

Second Embodiment

Figure 14:
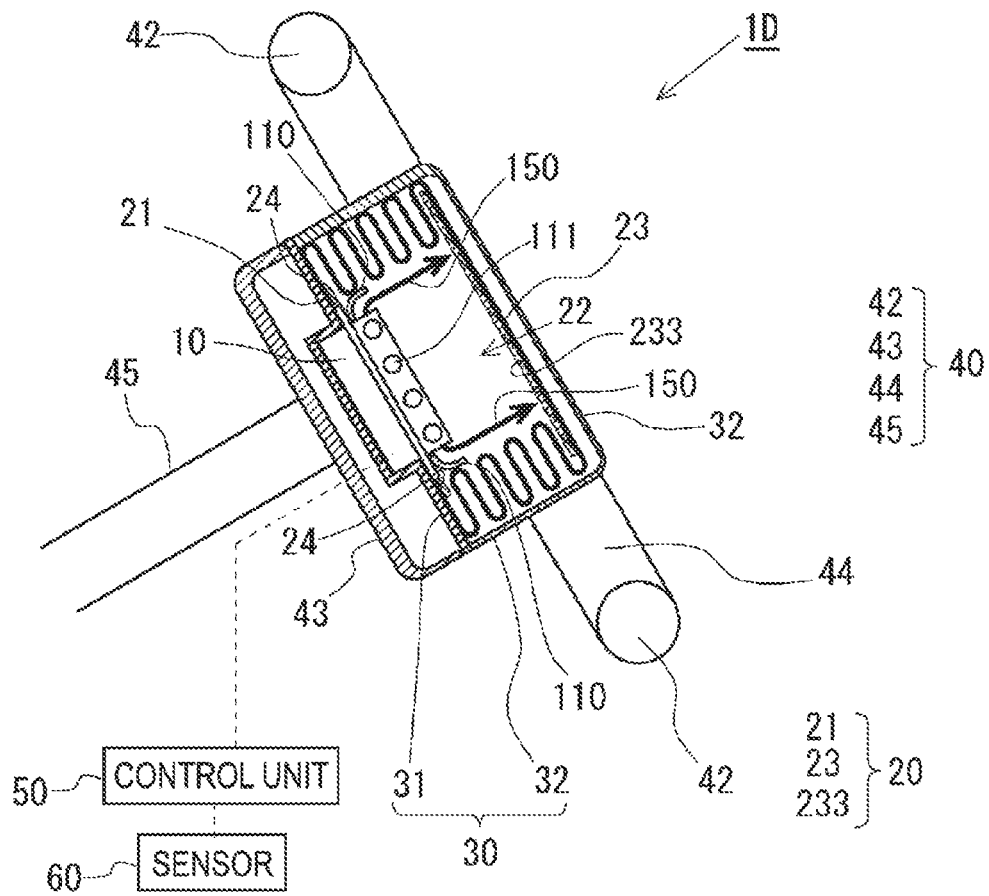
FIG. 14 is a diagram illustrating an airbag device according to a second embodiment.

FIG. 14 is a diagram illustrating an airbag device 1D according to a second embodiment. The airbag device 1D according to the present embodiment is different from that of the above-described embodiment in that a deflector 110 configured to deflect a flow direction of a combustion gas is disposed around the gas discharge port and the second gas generating agent 233 is disposed at a position to which the deflected combustion gas flows. Note that since the other configurations thereof are the same as those of the above-described embodiment, the same elements are denoted by the same reference signs or the like and the description thereof will not be repeated.

Figure 15:
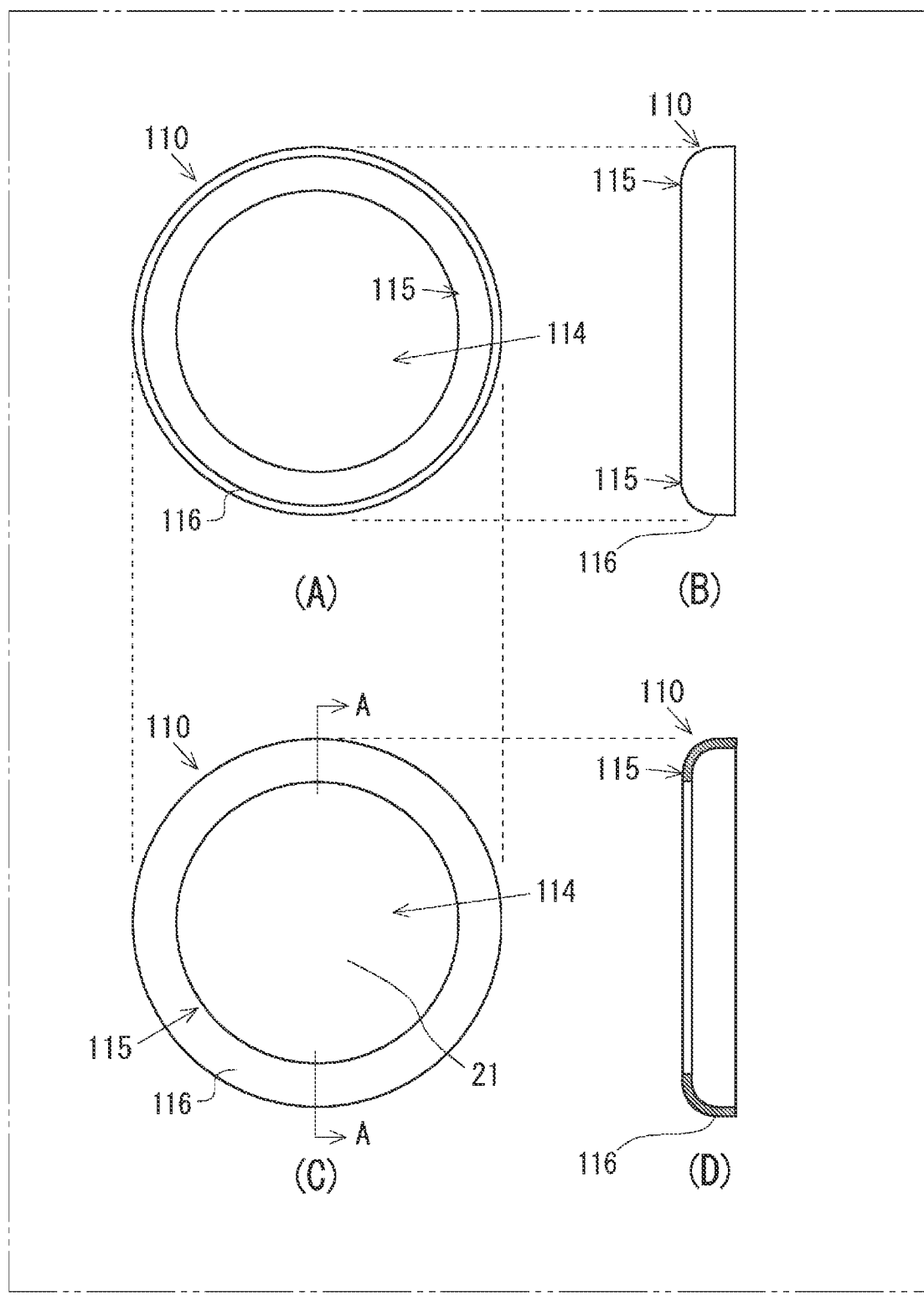
FIG. 15 is a diagram illustrating a configuration of a deflector.

FIG. 15 is a diagram illustrating a configuration of the deflector 110. FIG. 15(A) illustrates a front face of the deflector 110, FIG. 15(B) illustrates a side face of the deflector 110, FIG. 15(C) illustrates a rear face of the deflector 110, and FIG. 15(D) illustrates a cross section taken along line A-A in FIG. 15(C).

As illustrated in FIG. 15(A), the deflector 110 has an annular shape in a front view, and includes an opening 114 into which the gas generator 10 can be inserted at a central portion. The deflector 110 includes, on the rear face side, a rear wall portion 115 that has a planar shape and that is attached in contact with the holding base 31 of the outer shell case 30, and a deflecting portion 116 formed by bending an outer peripheral portion of the rear wall portion 115 in a bowl shape and extending forward. The deflector 110 can be formed by, for example, pressing a metal plate.

As illustrated in FIG. 14, the deflector 110 is fixed at the rear wall portion 115 thereof to the holding base 31 with screws or the like together with the joining portions 123 and 133 of the gas generator 10 in a state where the rear portion of the gas generator 10 passes through the opening 114. As described above, the deflector 110 is disposed around the gas discharge port 111, and the deflecting portion 116 bent forward is disposed, and thus surrounds the outlet port side of the gas discharge port 111. This deflects the combustion gas discharged from the gas discharge port 111 along the deflecting portion 116 and guides the combustion gas forward as indicated by arrows 150.

Then, the second gas generating agent 233 is disposed at a portion of the inner surface of the bag-shaped portion 23 to which the combustion gas deflected by the deflector is guided, that is, at the center inner side of the front side sheet 231 in the present embodiment.

As described above, in the present embodiment, since the deflector 110 guides the combustion gas discharged from the gas discharge port 111 in the direction in which the second gas generating agent is positioned, the combustion gas flows in a concentrated manner at the position of the second gas generating agent 233, and the gas can be efficiently generated from the second gas generating agent 233. In addition, the deflector made of a metal receives the combustion gas with a high temperature immediately after being discharged from the gas discharge port 111. This can prevent the bag-shaped portion 23 from being damaged by the heat of the combustion gas.

The airbag devices according to the present disclosure have been described above. Each aspect disclosed in the present specification can be combined with any other features disclosed in the present specification. For example, the airbag device 1D according to the second embodiment may also be configured as in the first to third modifications. It should be noted that in the second embodiment, when the second gas generating agent 233C is disposed on the upstream side from the second gas generating agent 233D as in the third modification, the upstream side and the downstream side may be set according to the flow direction of the combustion gas changed by the deflector 110. For example, in the airbag device 1D according to the second embodiment, the combustion gas is directed forward by the deflector 110, hits the vicinity of the central portion on the inner side of the front side sheet 231, and flows from the vicinity of the central portion to the peripheral edge side. For this reason, the vicinity of the central portion on the inner side of the front side sheet 231 is referred to as the upstream side, and the peripheral edge side is referred to as the downstream side. That is, the second gas generating agent 233C is disposed in the vicinity of the central portion on the inner side of the front side sheet 231, and the second gas generating agent 233D is disposed on the peripheral edge side with respect to the central portion. As a result, the non-combustion gas can be efficiently generated similarly to the third modification.

REFERENCE SIGNS LIST 1, 1A to 1D Airbag device
10 Gas generator
11 Housing
13A Attachment hole
14 igniter
15 Resin-made holding portion
16 Filter
17 Cup-shaped cover body
18 Transfer charge
19 Gas generating agent (first gas generating agent)
20 Airbag
21 Inflow portion
22 Internal space
23 Bag-shaped portion
24 Retainer
30 Outer shell case
31 Holding base
31A Base plate portion
31B Recessed portion
32 Cover member
32A Accommodating space
40 Steering wheel
42 Steering wheel ring
43 Boss portion
44 Spoke
50 Control unit
60 Sensor
110 Deflector
111 Gas discharge port
112 Front shell 113 Rear shell
114 Opening
115 Rear wall portion
116 Deflecting portion
121 Front peripheral wall portion
122 Front wall portion
123, 133 Joining portion
131 Rear peripheral wall portion
132 Rear wall portion
141 Ignition unit
142, 142 Electro-conductive pin
151 Base portion
152 Inner tubular wall portion
153 Front end opening
158 Transfer chamber
160 Combustion chamber
161 Inner circumferential surface
211 Opening
231 Front side sheet
232 Rear side sheet
233 Second gas generating agent
234 Cover member

The invention claimed is:

1. An airbag device, comprising:
a gas generator including a first gas generating agent that generates a combustion gas by ignition and an ignition unit configured to ignite the first gas generating agent; and
an airbag configured to inflate upon receiving supply of the combustion gas from the gas generator, the airbag including,
an inlet connected to the gas generator, the inlet being configured to cause the combustion gas supplied from the gas generator to flow into an internal space of the airbag,
a bag-shaped portion that is a bag-shaped body configured to separate, from an outside, the internal space into which the combustion gas flows from the inlet, the bag-shaped portion being configured to be in a folded state before receiving the supply of the combustion gas and to be in an inflated state by receiving the supply of the combustion gas, and
a second gas generating agent that is disposed at a predetermined position on an inner surface of the bag-shaped portion and generates gas by using thermal energy of the combustion gas without accompanying a combustion reaction.

2. The airbag device according to claim 1, wherein
a discharge port of the combustion gas in the gas generator is disposed toward the internal space, and
the second gas generating agent is disposed facing the discharge port in the bag-shaped portion in the folded state.

3. The airbag device according to claim 2, wherein
the second gas generating agent is a substance that is decomposed, vaporized, or sublimated by the thermal energy of the combustion gas and thus generates the gas.

4. The airbag device according to claim 2, wherein
when a period of supplying the combustion gas to the bag-shaped portion is defined as a first period, the second gas generating agent generates the gas over a second period longer than the first period.

5. The airbag device according to claim 2, wherein
a cover that is exhausted by the thermal energy of the combustion gas is disposed, and thus covers at least a part of the second gas generating agent.

6. The airbag device according to claim 2, wherein
a plurality of the second gas generating agents having reaction temperatures different from each other in generating the gas are provided at a plurality of positions, and
among the plurality of second gas generating agents provided at the plurality of positions, the second gas generating agent having the reaction temperature higher than a reaction temperature of another second gas generating agent is disposed on an upstream side from the other second gas generating agent in a flow direction of the combustion gas supplied from the gas generator.

7. The airbag device according to claim 1, wherein
a discharge port of the combustion gas in the gas generator is disposed toward the internal space, and
the second gas generating agent is disposed on the inner surface of the bag-shaped portion at a position away from the discharge port in an inflating direction when the bag-shaped portion inflates from the folded state due to inflow of the combustion gas.

8. The airbag device according to claim 7, wherein
the gas generator includes a housing in which a gas discharge port configured to discharge the combustion gas is formed,
a deflector is disposed around the gas discharge port, the deflector being configured to deflect a flow direction of the combustion gas in the inflating direction of the bag-shaped portion, and
the second gas generating agent is disposed in a portion to which the combustion gas deflected by the deflector is guided.

9. The airbag device according to claim 7, wherein
the second gas generating agent is a substance that is decomposed, vaporized, or sublimated by the thermal energy of the combustion gas and thus generates the gas.

10. The airbag device according to claim 7, wherein
when a period of supplying the combustion gas to the bag-shaped portion is defined as a first period, the second gas generating agent generates the gas over a second period longer than the first period.

11. The airbag device according to claim 7, wherein
a cover that is exhausted by the thermal energy of the combustion gas is disposed, and thus covers at least a part of the second gas generating agent.

12. The airbag device according to claim 7, wherein
a plurality of the second gas generating agents having reaction temperatures different from each other in generating the gas are provided at a plurality of positions, and
among the plurality of second gas generating agents provided at the plurality of positions, the second gas generating agent having the reaction temperature higher than a reaction temperature of another second gas generating agent is disposed on an upstream side from the other second gas generating agent in a flow direction of the combustion gas supplied from the gas generator.

13. The airbag device according to claim 1, wherein
the second gas generating agent is a substance that is decomposed, vaporized, or sublimated by the thermal energy of the combustion gas and thus generates the gas.

14. The airbag device according to claim 1, wherein
the combustion gas is supplied at a timing earlier by a predetermined period of time than a timing when the gas is to be generated from the second gas generating agent.

15. The airbag device according to claim 1, wherein
when a period of supplying the combustion gas to the bag-shaped portion is defined as a first period, the second gas generating agent generates the gas over a second period longer than the first period.

16. The airbag device according to claim 1, wherein
a cover that is exhausted by the thermal energy of the combustion gas is disposed, and thus covers at least a part of the second gas generating agent.

17. The airbag device according to claim 1, wherein
a plurality of the second gas generating agents having reaction temperatures different from each other in generating the gas are provided at a plurality of positions, and
among the plurality of second gas generating agents provided at the plurality of positions, the second gas generating agent having the reaction temperature higher than a reaction temperature of another second gas generating agent is disposed on an upstream side from the other second gas generating agent in a flow direction of the combustion gas supplied from the gas generator.

18. The airbag system, according to claim 1, wherein the gas generator is provided with a gas discharge port and the second gas generating agent is disposed facing the gas discharge port.

19. The airbag system, according to claim 1, wherein the second gas generating agent generates gas by endothermically using thermal energy of the combustion gas without accompanying the combustion reaction.

20. A method for inflating an airbag device, comprising:
igniting a first gas generating agent and thus generating a combustion gas by a gas generator, the gas generator including the first gas generating agent and an ignition unit configured to ignite the first gas generating agent;
starting inflation of a bag-shaped portion upon receiving supply of the combustion gas generated by ignition, in an airbag device including an airbag, the airbag including
an inlet connected to the gas generator, the inlet being configured to cause the combustion gas supplied from the gas generator to flow into an internal space of the airbag,
the bag-shaped portion that is a bag-shaped body configured to separate, from an outside, the internal space into which the combustion gas flows from the inlet, the bag-shaped portion being configured to be in a folded state before receiving the supply of the combustion gas and to be in an inflated state upon receiving the supply of the combustion gas, and
a second gas generating agent disposed at a predetermined position on an inner surface of the bag-shaped portion; and
generating gas from the second gas generating agent disposed in the bag-shaped portion by using thermal energy of the combustion gas without accompanying a combustion reaction.

21. The method for inflating an airbag device according to claim 20, further comprising;
providing the second gas generating agent facing a gas discharge port of the gas generator.

22. The method for inflating an airbag device according to claim 20, wherein
generating gas from the second gas generating agent by endothermically using thermal energy of the combustion gas without accompanying a combustion reaction.

* * * * *